Figure 1:
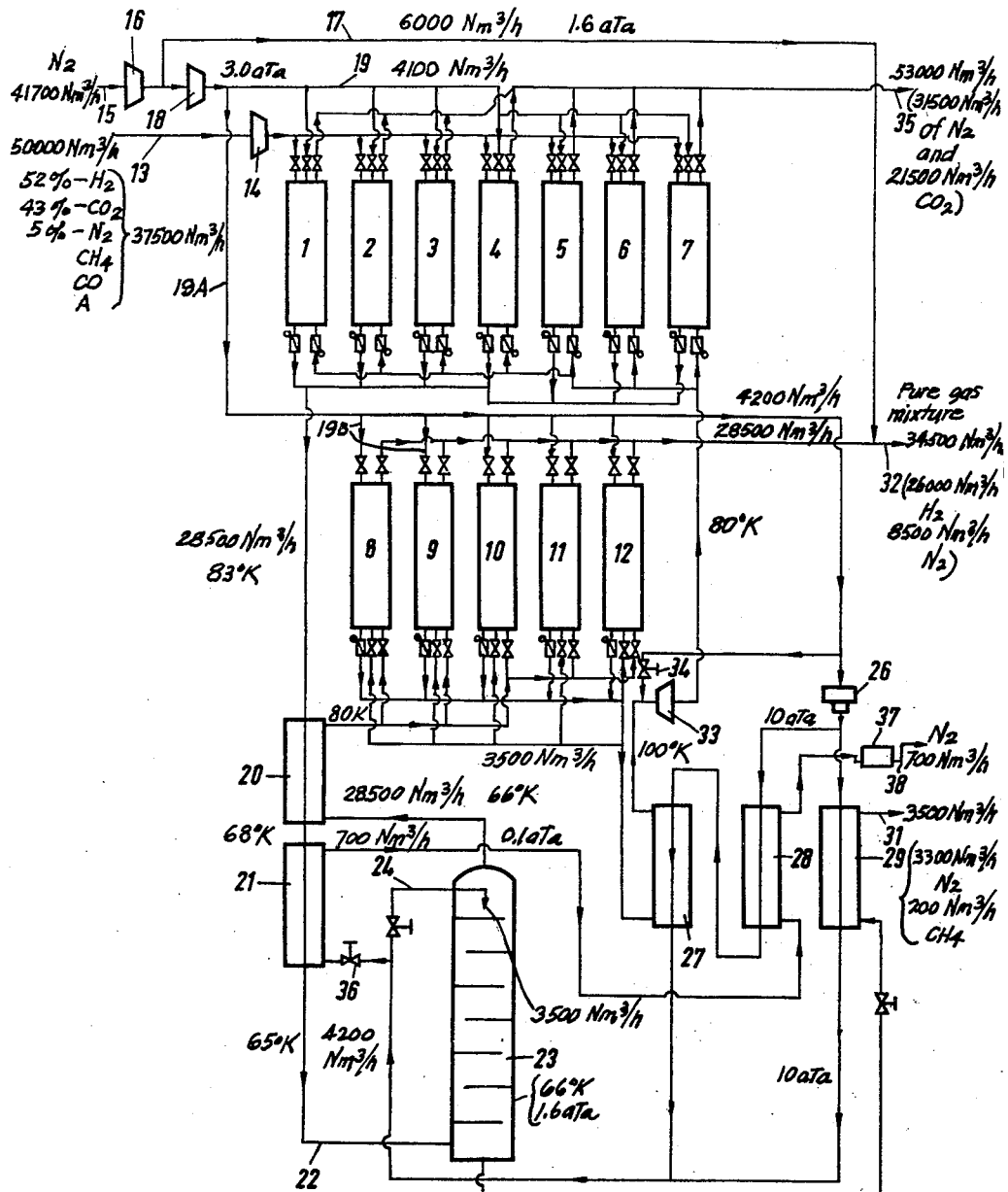

Inventor
RUDOLF BECKER
By Toulmin & Toulmin
Attorneys

3,192,729
PROCESS AND APPARATUS FOR PURIFYING
GASEOUS MIXTURES
Rudolf Becker, Munich-Solln, Germany, assignor to Gesellschaft fur Linde's Eismaschinen Aktiengesellschaft, Wiesbaden, Germany
Filed Nov. 29, 1961, Ser. No. 155,573
Claims priority, application Germany, Dec. 1, 1960, G 31,052
15 Claims. (Cl. 62—13)

The present invention relates to the production of a purified gas using low-temperature regenerators, more particularly, to a process and apparatus for removing condensible impurities from a gaseous mixture in low-temperature regenerators with the impurities being removed from the regenerators by a scavenging gas passed therethrough in the opposite direction to that of the gaseous mixture.

It has been known to remove condensible components from gaseous mixtures by cooling the gaseous mixtures in low-temperature regenerators wherein the condensible components are deposited therein. The cooled gaseous mixture is then subsequently further separated into the gaseous components thereof. The impurities remaining in the low-temperature regenerators are then absorbed by various gas fractionation products which are passed through the regenerators in the opposite direction. These fractionation products together with the impurities picked up from the regenerators are then discharged from the installation. This process has the disadvantage, however, that the gas fractionation products are not pure since they contain the impurities condensed out in the low-temperature regenerators.

Additional processes have been developed to produce particularly pure gases wherein the impurities which are separated out in the low-temperature regenerators are subjected to a sublimation in a special scavenging process which is preferably carried out in a low pressure atmosphere. This scavenging process is applied to the regenerators before the purified gas is flowed therethrough. This process, however, has the disadvantage that again gases of a high purity are difficult to obtain since small quantities of the impurities still remain in the regenerators even after the scavenging process. In addition, various leakages occur at the pilot valves as a part of the normal operation thereof and these leakages introduce impurities into the purified gas so that it is difficult to obtain a determined high degree of purity of the gas while operating the process over a long period of time. In addition, the sublimation process under reduced pressure is not particularly favorable from the energy point of view since this is an irreversible process.

The above-described disadvantages are particularly apparent when the gaseous mixture which is to be purified contains large quantities of condensible impurities as, for example, a converted gas which consists of about 40% of carbon dioxide. In such an instance other purification processes have been applied to the gaseous mixture in order to remove the major portion of carbon dioxide therefrom prior to introducing the gaseous mixture into the low-temperature installation itself. Such purification processes have comprised washing with water under pressure.

It is therefore the principal object of the present invention to provide a novel and improved process for purifying gaseous mixtures containing condensible impurities in low-temperature regenerators.

It is a further object of the present invention to provide a process for the removal of large quantities of condensible impurities from gaseous mixtures in low-temperature regenerators while avoiding any pollution of the purified gas produced by the process.

The objects of the present invention and the disadvantages of the previous processes are eliminated by the present invention which essentially comprises two groups of low-temperature regenerators wherein the gaseous mixture which is to be purified is introduced into one group of regenerators to be cooled therein and the purified gas obtained is passed through the second group of regenerators to be heated prior to discharge from the installation. A scavenging gas is introduced from an outside source to scavenge both groups of regenerators. The scavenging gas is passed through one group of regenerators and then through the second group of regenerators. Thus, the two groups of regenerators are coupled by the scavenging gas. The quantity of the scavenging gas supplied from an outside source is approximately equal to the quantity of the purified gas produced by the process.

Some of the scavenging gas may be produced through the separation of the gaseous mixture. For example, in a low-temperature installation for the separation of air the nitrogen produced thereby can be used for the scavenging gas. However, the major portion of the scavenging gas is supplied by an outside source.

The gaseous mixture which is initially passed through one group of regenerators is purified by the condensation of condensible impurities therein. If desired, this gas may then be further purified by a washing process.

The process as disclosed herein is particularly advantageous since the impurities separated in the regenerators can be removed by sublimation at substantially the same temperature, the same total pressure and the same partial pressure at which they were initially deposited in the regenerators. Accordingly, this sublimation process is most favorable from an energy point of view since it is a reversible process.

Figure 2:
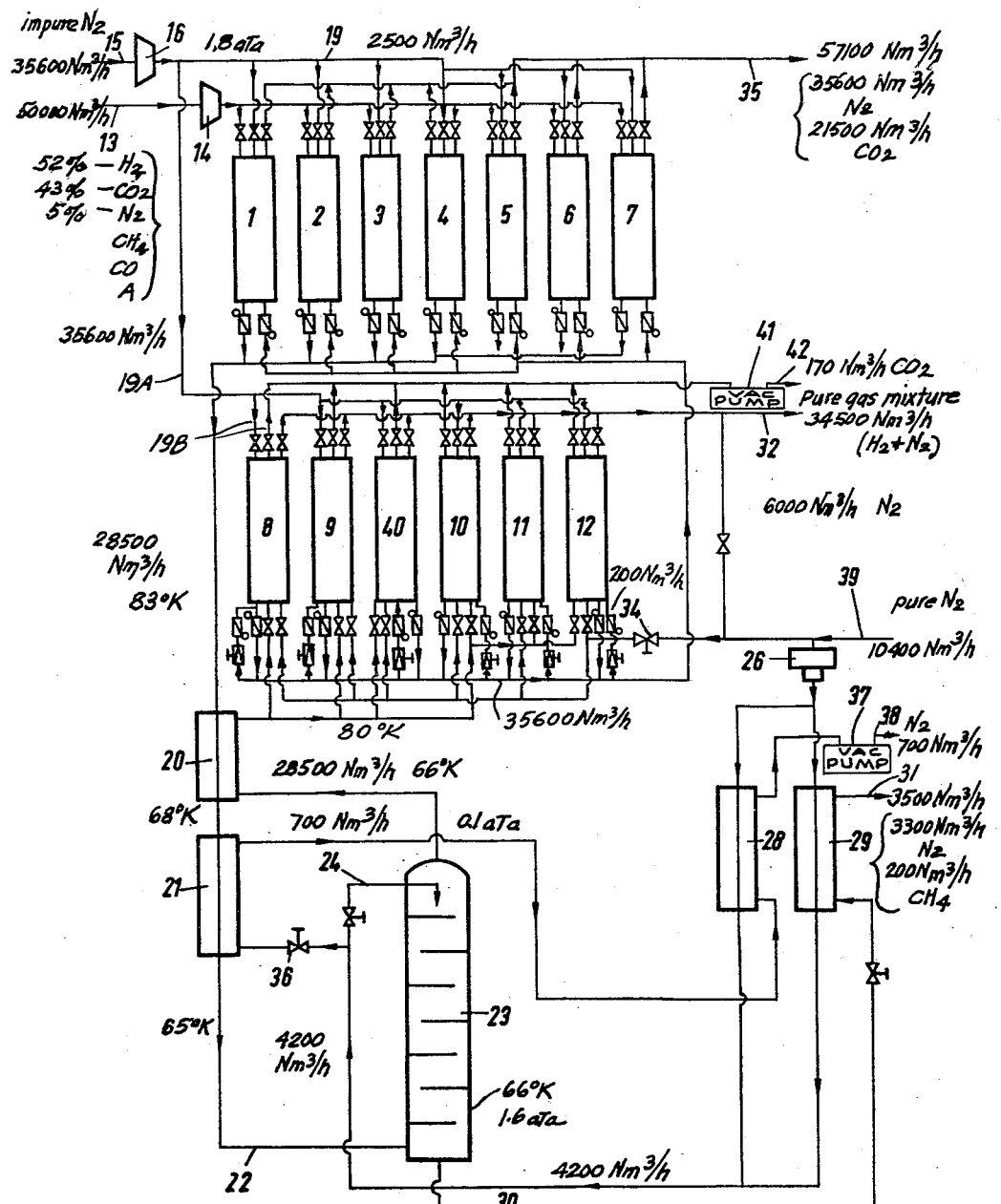

Other objects and advantages of this invention will be apparent from the accompanying description when taken in conjunction with the following drawings, wherein FIGURE 1 is a schematic representation of a low-temperature installation for the removal of condensible impurities from a gaseous mixture wherein pure nitrogen is used as a scavenging gas; and FIGURE 2 is a view similar to that of FIGURE 1 of a like installation but wherein impure nitrogen is used for scavenging the regenerators.

Proceeding next to the drawings, wherein like reference symbols indicate the same parts throughout the various views, the process of this invention will be disclosed in detail through the description of two specific examples thereof respectively illustrated in FIGURES 1 and 2.

With specific reference to FIGURE 1 the installation disclosed therein comprises a first group of regenerators 1 through 7 through which the incoming crude or raw gas mixture is circulated and a second group of regenerators 8 through 12 through which the purified gas is recirculated immediately prior to discharge from the installation. The scavenging gas, the major portion of which is obtained from an outside source, is circulated through both groups of regenerators. The functions of the individual regenerators of each group are cyclically interchanged with each other through a conventional switching arrangement. The number of pilot valves for each regenerator is illustrated at regenerator 1 for regenerators 1 through 7 and at regenerator 8 for the group of regenerators 8 through 12.

50,000 cubic meters per hour of a gaseous mixture containing 52% of hydrogen, 43% carbon dioxide and 5% of other impurities such as nitrogen, methane, carbon monoxide and argon are introduced through supply conduit 13. (Hereinafter the gas volumes in cubic meters per hour are indicated as m.³/h. and all such volumetric measurements are made at the standard, or what is known as "normal" conditions of a temperature of 0° C. and at a pressure of 1 atmosphere or 760 mm. of mercury.) This gaseous mixture is then compressed to approximately 1.8 atmospheres absolute in compressor 14 and then passed through the parallel connected regenerators 1, 2 and 3 within which it is cooled down to a temperature of 83° K. The volume of gas leaving the regenerators at this temperature is 28,500 m.³/h. since the condensible impurities such as carbon dioxide, water, hydrogen sulfide and the like were removed in the regenerators 1, 2 and 3.

This purified gas is then passed through a heat-exchanger 20 within which it is cooled to a temperature of 68° K. and then through a second heat-exchanger 21 within which it is cooled to a temperature of 65° K. This cooled purified gas is then supplied through conduit 22 to a washing tower 23. This gaseous mixture entering the washing tower 23 contains approximately 2,500 m.³/h. of nitrogen, methane, carbon monoxide and argon.

Approximately 41,700 m.³/h. of pure nitrogen are supplied to the installation through conduit 15 and compressed to a pressure of about 1.4 atmospheres absolute in compressor 16. About 6,000 m.³/h. of this compressed nitrogen is then drawn off through conduit 17 and mixed to the hydrogen-nitrogen atmosphere being discharged through conduit 32 in order to obtain the stoichiometric relationship necessary for the ammonia synthesis.

The main portion of the pure nitrogen, about 35,700 m.³/h., is further compressed to a pressure of 3.0 atmospheres absolute in the compressor 18. Approximately 4,100 m.³/h. of nitrogen at 3.0 atmospheres absolute are then drawn off through conduit 19 to be supplied to regenerator 4 for removing the crude gas mixture therefrom during the reversal. This quantity of nitrogen is not considered in the material balance to be subsequently described.

The nitrogen leaving the regenerator 4 is then mixed to the gaseous mixture discharged from the regenerators 1, 2 and 3 and combined therewith to be supplied to the washing column 23. The main quantity of the nitrogen compressed in the compressor 18 is then passed through conduit 19a and conduit 19b to be cooled in regenerators 8 and 9 and then combined. Approximately 31,500 m.³/h. of nitrogen are passed through the regenerators 8 and 9. A portion of this cooled nitrogen is then passed through regenerator 12 and added to the mixture of hydrogen and nitrogen discharged through conduit 32.

The other portion of this cooled nitrogen is then passed through heat-exchanger 27 within which it is heated to approximately 100° K. This nitrogen is then supplied to a turbine 33 at a pressure of about 2.8 atmospheres absolute and is expanded in the turbine 33 to a pressure of about 1.2 atmospheres absolute and a temperature of about 80° K. The expanded nitrogen is then heated again in the gas mixture regenerators 5, 6 and 7 and removes therefrom the impurities deposited therein during previous cycles. A mixture of gases having a volume of 53,000 m.³/h. which is composed of 31,500 m.³/h. of nitrogen and 21,500 m.³/h. of carbon dioxide, is discharged from the installation through conduit 35.

A portion of the nitrogen compressed in the compressor 18 and consisting of about 4,200 m.³/h. is compressed to approximately 10 atmospheres absolute in compressor 26 and then divided into two streams. These streams are cooled and liquefied in heat-exchangers 28 and 29, are then combined and the major portion thereof introduced as a washing liquid into the head of the washing column 23 through the conduit 24. This portion comprises about 3,500 m.³/h. The remaining portion of the liquefied nitrogen comprising about 700 m.³/h. is drained off through valve 36 and vaporized in heat-exchanger 21 to a pressure of about 0.1 atmosphere absolute and then drawn off through the heat-exchanger 28 through the vacuum pump 37 and discharged at 38.

Prior to introducing the nitrogen to the compressor 26, a small portion is drawn off through valve 34 and introduced to the supply line of the turbine 33 in order to regulate the temperature therein.

The purified gas mixture which is supplied through conduit 22 to the washing column 23 is washed therein at a pressure of about 1.6 atmospheres absolute. About 28,500 m.³/h. of purified gas is then discharged from the top of the washing column 23 at a temperature of 66° K. and is flowed into the heat-exchanger 20 within which it is heated to a temperature of 80 to 83° K. This heated purified gas is then introduced into the regenerators 10 and 11 within which it is further heated and then discharged from the installation through the conduit 32. A total quantity of 34,500 m.³/h. of gas is discharged through the conduit 32 and comprises 26,000 m.³/h. of hydrogen and 8,500 m.³/h. of nitrogen.

Discharged from the sump of the washing column 23 through the discharge line 30 is approximately 3,500 m.³/h. of a liquid mixture composed of 3,300 m.³/h. of nitrogen and 200 m.³/h. of methane, carbon monoxide and argon. This liquid mixture is then subsequently evaporated and heated in the heat exchanger 29 and discharged from the installation through conduit 31.

The quantity of pure gas produced by this process through this installation and discharged at 32 totals 34,500 m.³/h. which gas comprises 26,000 m.³/h. of hydrogen and 8,500 m.³/h. of nitrogen. This quantity of pure gas is substantially balanced by the outside gas introduced for scavenging and flowing through regenerators 5, 6 and 7 which comprises 31,500 m.³/h. of pure nitrogen. This quantity of scavenging gas removes from the regenerators 21,500 m.³/h. of carbon dioxide which was previously deposited therein as impurities. However, this quantity of carbon dioxide is not counted in the material balance. Thus, the balancing of the gases as disclosed in this invention is the 31,500 m.³/h. of nitrogen and the 34,500 m.³/h. of pure gas of the synthesis.

The 4,100 m.³/h. of nitrogen supplied to the regenerator 4 from the compressor 18 does not affect the material balance since this nitrogen is supplied to regenerator 4 only for a period of about 30 seconds during the time between reversal of cycles of the regenerators and during which time no gases are flowing through the regenerators. Thus, during this short period of time a quantity of nitrogen is momentarily divided from the compressor 18 and introduced into the regenerator 4 at the rate of 4,100 m.³/h. of nitrogen. However, since this quantity of nitrogen is not continuous and is only for a short period of time, it does not affect the material balance and for practical purposes 35,700 m.³/h. of nitrogen are supplied to the regenerators 8 and 9 and the compressor 26 even after these momentary withdrawals of nitrogen through the line 19.

Proceeding next to FIGURE 2, there will be described a further specific example of the present invention wherein impure nitrogen is used as the scavenging gas. In this modification approximately 35.600 m.³/h. of impure nitrogen are introduced into the installation through conduit 15 and compressed to a pressure of about 1.8 atmospheres absolute in the compressor 16. This impure nitrogen has an oxygen content of less than 4% and a carbonic acid content of less than 0.03%. From the compressed nitrogen discharged from the compressor 16 quantities are momentarily withdrawn therefrom at a rate of 2,500 m.³/h. and passed through the regenerator 4 for removing the gaseous mixture contained therein. Since this passage of nitrogen through the regenerator 4 is only momentary, this particular portion of nitrogen does not essentially affect the material balance of the process.

Virtually, the entire quantity of nitrogen compressed by the compressor 16 or 35,600 m.³/h. is then passed through regenerators 8 and 9. Since the pressure of the nitrogen passing through the regenerators is only somewhat higher than the atmospheric pressure, this nitrogen cannot be used for refrigerating purposes and cannot be expanded while simultaneously performing work. For this reason this modification eliminates the turbine 33 and heat-exchanger 27 shown in FIGURE 1.

In order to compensate for cooling losses in the installation 10,400 m.³/h. of pure nitrogen are supplied to the installation through conduit 39 and compressed to approximately 200 atmospheres absolute in the compressor 26.

About 6,000 m.³/h. of pure nitrogen are withdrawn from the conduit 39 through a conduit 43 and supplied to the mixture discharged at 32 in order to provide the necessary stoichiometric relationship for the subsequent ammonia synthesis.

About 200 m.³/h. of pure nitrogen are passed through the regenerator 12 for removing the hydrogen therefrom during the period between the reversal of cycles of the regenerators. Since this quantity of pure nitrogen is only momentary, it is not considered in the heat or material balance of the process.

In order to remove impurities from the regenerators 8 and 9 and the residues of the impure nitrogen from the pure gas regenerators, a scavenging cycle is provided prior to heating of the purified gas in the pure gas regenerators. As can be seen in FIGURE 2, a regenerator 40 is scavenged with a portion of the gas which has been purified in the regenerators 8 and 9. This gas is withdrawn in the scavenging cycle under low pressure through vacuum pump 41 and is discharged from the installation through conduit 42. This gas comprises 170 m.³/h. of $CO_2$.

In a manner similar to that of FIGURE 1 50,000 m.³/h. of a crude gas mixture containing 52% of hydrogen, 43% of carbon dioxide and 5% of other impurities including nitrogen, methane, carbon monoxide and argon are introduced through the uspply conduit 13. This gaseous mixture is processed under the similar conditions as set forth in FIGURE 1 and 34,500 m.³/h. of pure gas are discharged through the conduit 32 and comprise 26,000 m.³/h. of hydrogen and 8,500 m.³/h. of nitrogen. This quantity of pure gas is essentially balanced by the 35,600 m.³/h. of nitrogen used for scavenging and discharged at 35.

Thus it can be seen that the present invention provides an improved process for the removal of condensible impurities such as carbon dioxide from gaesous mixtures by low-temperature regenerators.

It will be understood that this inveniton is susceptible to further modification and, accordingly, it is desired to comprehend such modifications within this invention as may fall within the scope of the appended claims.

What is claimed as this invention is:

1. A process for purifying a gas by the separation of condensible impurities therein in low-temperature regenerators, and comprising the steps of reducing the temperature of a gaseous mixture having condensible components therein in a first low-temperature regenerator to condense the impurities therein and to obtain a cold purified gas, cooling a gas introduced from an outside source by a heat exchange with said cold purified gas in a second low-temperature regenerator whereby the first regenerator is used for the gaseous mixture and the second regenerator is used for warming said cold purified gas, and scavenging the condensed impurities from the first regenerator by the gas introduced from an outside source and cooled in the second regenerator, with the quantity of the cooled outside-source gas being approximately equal to the quantity of the cold purified gas produced.

2. The process of claim 1 further comprising applying a vacuum to the first regenerator to remove a portion of the condensed impurities.

3. The process of claim 1 wherein the gas introduced from the outside source is pure nitrogen.

4. The process of claim 1 wherein the gas introduced from the outside source is moist impure nitrogen.

5. A process for purifying a gaseous mixture by the separation of condensible impurities therein in low-temperature regenerators, and comprising the steps of reducing the temperature of a gaseous mixture having condensible components therein in a first low-temperature regenerator to condense the impurities therein and to obtain a purified gas, passing a part of a second gas from an outside source through the regenerator to remove the gaseous mixture therefrom, cooling a first gas introduced from an outside source in a second low temperature regenerator by heat exchange with a cold purified gaseous mixture consisting of the purified gas and the second gas introduced from an outside source whereby the first regenerator is used for the gaseous mixture and the second regenerator is used for purified gas, and scavenging the condensed impurities from the first regenerator by the first gas introduced from an outside source after removal of the gaseous mixture therefrom with the quantity of the first outside gas being approximately equal to the quantity of purified gaseous mixture.

6. A process for purifying a gas by the separation of condensible impurities therein in low-temperature regenerators, and comprising the steps of reducing the temperature of a gaseous mixture having condensible components therein in a low-temperature regenerator to condense the impurities therein and to obtain a purified gas, cooling a gas introduced from an outside source by a heat exchange with cold purified gas in a second low-temperature regenerator whereby the first regenerator is used for the gaseous mixture and the second regenerator is used for purified gas, and scavenging the condensed impurities from the low-temperature regenerator by the gas introduced from an outside source with the quantity of the outside gas being approximately equal to the quantity of purified gas produced, the pressure at which the purified gas is discharged from the second regenerator being greater than the pressure at which the outside gas enters the second regenerator.

7. A process for purifying a gas by the separation of condensible impurities therein in low-temperature regenerators, and comprising the steps of reducing the temperature of a gaseous mixture having condensible components therein in a low-temperature regenerator to condense the impurities therein and to obtain a purified gas, cooling a gas introduced from an outside source by a heat exchange with cold purified gas in a second low-temperature regenerator whereby the first regenerator is used for the gaseous mixture and the second regenerator is used for purified gas, scavenging the condensed impurities from the low-temperature regenerator by the gas introduced from an outside source with the quantity of the gas being approximately equal to the quantity of purified gas produced, and washing the purified gas with a liquefied gas to further purify the purified gas.

8. A process for purifying a gas by the separation of condensible impurities therein in low-temperature regenerators, and comprising the steps of reducing the temperature of a gaseous mixture having condensible components therein in a low-temperature regenerator to condense the impurities therein and to obtain a purified gas, cooling a gas introduced from an outside source by a heat exchange with cold purified gas in a second low-temperature regenerator whereby the first regenerator is used for the gaseous mixture and the second regenerator is used for purified gas, passing the outside gas through the second regenerator to remove the purified gas therefrom, and scavenging the condensed impurities from the low-temperature regenerator by the outside gas after removal of the purified gas from the second regenerator with the quantity of the outside gas being approximately equal to the quantity of purified gas produced.

9. A process for purifying a gas by the separation of condensible impurities therein in low-temperature regenerators, and comprising the steps of reducing the temperature of a gaseous mixture having condensible components therein in a low-temperature regenerator to condense the impurities therein and to obtain a purified gas, cooling a gas introduced from an outside source by a heat exchange with cold purified gas in a second low-temperature regenerator whereby the first regenerator is used for the gaseous mixture and the second regenerator is used for purified gas, scavenging the condensed impurities from the low-temperature regenerator by the gas introduced from an outside source with the quantity of the gas being approximately equal to the quantity of purified gas produced, and expanding the outside gas while simultaneously producing work therewith, said expanding step being intermediate the heat exchange and scavenging steps.

10. A process for purifying a gas by the separation of condensible impurities therein in low-temperature regenerators, and comprising the steps of reducing the temperature of a gaseous mixture having condensible components therein in a low-temperature regenerator to condense the impurities therein and to obtain a purified gas, cooling a moist impure nitrogen containing carbon dioxide and introduced from an outside source by a heat exchange with cold purified gas in a second-low-temperature regenerator, whereby the first regenerator is used for the gaseous mixture and the second regenerator is used for purified gas, scavenging the condensed impurities from the first regenerator with the moist impure nitrogen, the quantity of the impure nitrogen being approximately equal to the quantity of purified gas produced, and scavenging the second regenerators with pure nitrogen introduced from an outside source to remove the carbon dioxide and water separated therein from the moist impure nitrogen containing carbon dioxide.

11. A process for purifying a gas by the separation of condensible impurities therein in low-temperature regenerators, and comprising the steps of reducing the temperature of a gaseous mixture having condensible components therein in a low-temperature regenerator to condense the impurities therein and to obtain a purified gas, cooling a moist impure nitrogen containing carbon dioxide and introduced from an outside source by a heat exchange with cold purified gas in a second low-temperature regenerator, whereby the first regenerator is used for the gaseous mixture and the second regenerator is used for purified gas, scavenging the condensed impurities from the first regenerator with the moist impure nitrogen, the quantity of the impure nitrogen being approximately equal to the quantity of purified gas produced, scavenging the second regenerators with pure nitrogen introduced from an outside source to remove the carbon dioxide and water separated therein from the moist impure nitrogen containing carbon dioxide, and passing pure nitrogen through the second regenerator prior to passing purified gas therethrough.

12. A process for purifying a gas by the separation of condensible impurities therein in low-temperature regenerators, and comprising the steps of reducing the temperature of a gaseous mixture having condensible components therein in a low-temperature regenerator to condense the impurities therein and to obtain a purified gas, cooling a gas introduced from an outside source by a heat exchange with cold purified gas in a second low-temperature regenerator whereby the first regenerator is used for the gaseous mixture and the second regenerator is used for purified gas, scavenging the condensed impurities from the low-temperature regenerator by the gas introduced from an outside source with the quantity of the gas being approximately equal to the quantity of purified gas produced, washing the purified gas with a liquefied gas to further purify the purified gas, and passing the further purified gas through the second regenerator to scavenge the same.

13. An arrangement for purifying a gaseous mixture by the separation of condensible impurities therefrom, and comprising first and second non-interchangeable groups of regenerators, a source of a gaseous mixture connected to said first group of regenerators, said first group of regenerators having an outlet for purified gas therefrom, a source of an outside gas connected to said second group of regenerators, means for connecting said second regenerators to said outlet of said first regenerators so that said purified gas passes therethrough, means for connecting the outside gas emerging from said second regenerators to said first regenerators, and a switching arrangement means for cyclically interchanging the functions of the regenerators in said groups between the exchange of heat between the gaseous mixture and outside gas in said first group of regenerators and between the exchange of heat between the outside gas and the purified gas in said second group of regenerators.

14. An arrangement for purifying a gaseous mixture by the separation of condensible impurities therefrom, and comprising first and second non-interchangeable groups of regenerators, a source of a gaseous mixture connected to said first group of regenerators, said first group of regenerators having an outlet for purified gas therefrom, a source of an outside gas connected to said second group of regenerators, a washing column connected between said first and second groups of regenerators and conduit means arranged so that the purified gases entering said washing column from said first regenerators are further purified before entering said second regenerators, means for connecting the outside gas emerging from said second regenerators to said first regenerators, and a switching arrangement means for cyclically interchanging the functions of the regenerators in said groups between the exchange of heat between the gaseous mixture and outside gas in said first group of regenerators and between the exchange of heat between the outside gas and the purified gas in said second group of regenerators.

15. A process for purifying a gas by the separation of condensible impurities therein in low-temperature regenerators, and comprising the steps of reducing the temperature of a gaseous mixture having condensible impurities components therein in a first low-temperature regenerator to condense the impurities therein and to obtain a purified gas, cooling a first gas introduced from an outside source in a second low-temperature regenerator by heat exchange with a cold purified gaseous mixture consisting of the purified gas and a second gas introduced from an outside source whereby the first regenerator is used for the gaseous mixture and the second regenerator is used for purified gas, and scavenging the condensed impurities from the first regenerator by the first gas introduced from an outside source with the quantity of the first gas being approximately equal to the quantity of purified gaseous mixture.

References Cited by the Examiner
UNITED STATES PATENTS 2,089,558  8/37  Karwat _____ 62—12
2,895,304  7/59  Wucherer.

FOREIGN PATENTS 707,079  6/41  Germany.
744,928  1/44  Germany.

NORMAN YUDKOFF, Primary Examiner.

ROBERT A. O'LEARY, Examiner.